United States Patent
Kwon et al.

(10) Patent No.: US 9,405,546 B2
(45) Date of Patent: Aug. 2, 2016

(54) APPARATUS AND METHOD FOR NON-BLOCKING EXECUTION OF STATIC SCHEDULED PROCESSOR

(71) Applicant: Samsung Electronics Co., Ltd., Suwon-si (KR)

(72) Inventors: Kwon Taek Kwon, Seoul (KR); Sang Oak Woo, Anyang-si (KR); Shi Hwa Lee, Seoul (KR); Seok Yoon Jung, seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 14/199,154

(22) Filed: Mar. 6, 2014

(65) Prior Publication Data

US 2014/0258690 A1 Sep. 11, 2014

(30) Foreign Application Priority Data

Mar. 11, 2013 (KR) .................. 10-2013-0025509

(51) Int. Cl.
*G06F 9/38* (2006.01)
*G06F 9/30* (2006.01)

(52) U.S. Cl.
CPC .......... *G06F 9/3836* (2013.01); *G06F 9/30043* (2013.01); *G06F 9/3832* (2013.01); *G06F 9/3842* (2013.01); *G06F 9/3859* (2013.01)

(58) Field of Classification Search
None
See application file for complete search history.

(56) References Cited

U.S. PATENT DOCUMENTS

| | | | |
|---|---|---|---|
| 2001/0042187 A1* | 11/2001 | Tremblay | 712/2 |
| 2006/0095715 A1* | 5/2006 | Srinivasan et al. | 712/24 |
| 2009/0150890 A1* | 6/2009 | Yourst | 718/102 |
| 2009/0198972 A1 | 8/2009 | Nystad et al. | |
| 2014/0143883 A1* | 5/2014 | Shen-Orr et al. | 726/26 |

OTHER PUBLICATIONS

Extended European Search Report dated Jun. 18, 2014 in European Patent Application No. 14158460.7.
Toshinori Sato, "A Simple Mechanism for Collapsing Instructions under Timing Speculation", IEICE Trans. Electron., vol. E91-C, No. 9, Sep. 2008, pp. 1394-1401.
Andrew Hilton et al., "iCFP: Tolerating All-Level Cache Misses in In-Order Processors", IEEE, 2008, pp. 431-442.

* cited by examiner

*Primary Examiner* — William B Partridge
(74) *Attorney, Agent, or Firm* — NSIP Law

(57) ABSTRACT

An apparatus and method for non-blocking execution of a static scheduled processor, the apparatus including a processor to process at least one operation using transferred input data, and an input buffer used to transfer the input data to the processor, and store a result of processing the at least one operation, wherein the processor may include at least one functional unit (FU) to execute the at least one operation, and the at least one FU may process the transferred input data using at least one of a regular latency operation and an irregular latency operation.

16 Claims, 5 Drawing Sheets

APPARATUS AND METHOD FOR NON-BLOCKING EXECUTION OF STATIC SCHEDULED PROCESSOR

CROSS-REFERENCE TO RELATED APPLICATIONS

This application claims the priority benefit of Korean Patent Application No. 10-2013-0025509, filed on Mar. 11, 2013, in the Korean Intellectual Property Office, the disclosure of which is incorporated herein by reference.

BACKGROUND

1. Field

The following description relates to an apparatus and method for non-blocking execution of a static scheduled processor that may maintain an operation ability without switching the entire processor to a stall state for a long cycle when a latency greater than an expected latency occurs during an operation with respect to input data.

2. Description of the Related Art

A static scheduled processor refers to a processor which determines an order in which and a functional unit (FU) by which an operation to be applied to input data is to be executed, when compiling. Among software pipelining algorithms, a Samsung Reconfigurable Processor (SRP), which determines a schedule, may correspond to the static scheduled processor.

An operation schedule of a processor may be generated for an operation to produce an optimal execution performance, in view of an available FU, a point in time at which input data for the operation is prepared, and a latency of the operation, for example.

Here, computation of an accurate timing for a regular latency operation, more particularly, an operation of which a latency is regular, may be possible when compiling, and thus, an optimal schedule may be generated. However, in a case of an irregular latency operation, more particularly, when an operation of which a latency is irregular, a method of generating a schedule by assuming a single latency value when compiling, and handling an occurrence of a latency differing from the assumed latency at a runtime may be employed.

SUMMARY

In a static schedule based processor, operations are scheduled to be executed in an order determined at compile time, and each operation is allocated a predetermined time period in which to execute. Therefore, if an operation requires a longer time for execution than the allocated time, the processor may be stalled, and performance suffers.

Accordingly, when an operation is determined to exceed its allocated execution time, the processor may output a dummy value rather than stall. Therefore, a subsequent operation may be executed without delay. The operation determined to exceed its allocated execution time may then be re-executed to obtain a result based on a normal completion of the operation.

Because re-execution of an operation may be performed in less time than a delay caused by a stall, performance of the processor may be improved.

The foregoing and/or other aspects may be achieved by providing an apparatus for non-blocking execution of a static scheduled processor, the apparatus including a processor to process at least one operation using transferred input data, and an input buffer used to transfer the input data to the processor, and store a result of processing the at least one operation. Here, the processor may include at least one functional unit (FU) to execute the at least one operation, and the at least one FU may process the transferred input data using at least one of a regular latency operation and an irregular latency operation.

The at least one FU may determine whether the input data is to be processed using the regular latency operation or the irregular latency operation.

When the input data is determined to be processed using the irregular latency operation, the at least one FU may verify whether a value resulting from a previous operation with respect to the input data is stored in the input buffer.

When the value resulting from the previous operation is stored in the input buffer, the at least one FU may output the value resulting from the previous operation after expiration of an expected latency defined by a schedule.

When the value resulting from the previous operation is absent in the input buffer, the at least one FU may execute an operation, and determine whether an extra latency occurs during execution of the operation.

When an extra latency occurs during execution of the operation, the at least one FU may output a dummy value and record a state bit corresponding to the output dummy value in the input buffer.

The at least one FU may record a final value resulting from the operation in the input buffer after the execution of the operation for which the extra latency occurs is terminated.

When an extra latency does not occur during execution of the operation, the at least one FU may output a value resulting from the execution of the operation, and record the output resulting value in the input buffer.

The input buffer may include a state register and a result buffer. The state register may store a state with respect to the input data, and the result buffer may store a value resulting from a previous operation.

The state register may store a state associated with whether the operation with respect to the input data is to be re-executed.

The foregoing and/or other aspects may be achieved by providing a static scheduled processor, including an operation processing unit to receive input data transferred from an input buffer, and execute an operation using a plurality of FUs, a determiner to determine whether an extra latency occurs in at least one of the plurality of FUs during execution of the operation with respect to the input data, and a storage processing unit to output a dummy value, and store the dummy value in the input buffer when an extra latency occurs.

The operation processing unit may verify whether a value resulting from a previous operation with respect to the transferred input data is stored in the input buffer, and output the value resulting from the previous operation after expiration of an expected latency defined by a schedule, when the value resulting from the previous operation is stored in the input buffer.

The operation processing unit may verify whether a value resulting from a previous operation with respect to the transferred input data is stored in the input buffer, and execute an operation of the input data, when the value resulting from the previous operation is absent in the input buffer.

The foregoing and/or other aspects may be achieved by providing a method for non-blocking execution of a static scheduled processor, the method including processing, by a processor, at least one operation using transferred input data, and transferring, using an input buffer, the input data to the processor, and storing a result of processing the at least one operation. Here, the processing may include processing the transferred input data using at least one of a regular latency operation and an irregular latency operation.

The processing may include determining whether the input data is to be processed using the regular latency operation or the irregular latency operation.

The processing may include verifying whether a value resulting from a previous operation with respect to the input data is stored in the input buffer, when the input data is determined to be processed using the irregular latency operation.

The processing may include outputting the value resulting from the previous operation after expiration of an expected latency defined by a schedule, when the value resulting from the previous operation is stored in the input buffer.

The processing may include executing an operation and determining whether an extra latency occurs during execution of the operation, when the value resulting from the previous operation is absent in the input buffer.

The processing may include outputting a dummy value and recording a state bit corresponding to the output dummy value in the input buffer, when an extra latency occurs during execution of the operation.

The processing may include recording a final value resulting from the operation in the input buffer after the execution of the operation for which the extra latency occurs is terminated.

The processing may include outputting a value resulting from execution of the operation, and recording the output resulting value in the input buffer, when an extra latency does not occur during the execution of the operation.

The foregoing and/or other aspects may be achieved by providing an operating method of a static scheduled processor, the method including receiving, by an operation processing unit, input data transferred from an input buffer, and executing an operation using a plurality of FUs, determining, by a determiner, whether an extra latency occurs in at least one of the plurality of FUs during execution of the operation with respect to the input data, and outputting, by a storage processing unit, a dummy value, and storing the dummy value in the input buffer when an extra latency occurs.

The performing may include verifying whether a value resulting from a previous operation with respect to the transferred input data is stored in the input buffer, and outputting the value resulting from the previous operation after expiration of an expected latency defined by a schedule, when the value resulting from the previous operation is stored in the input buffer.

The performing may include verifying whether a value resulting from a previous operation with respect to the transferred input data is stored in the input buffer, and executing an operation of the input data, when the value resulting from the previous operation is absent in the input buffer.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
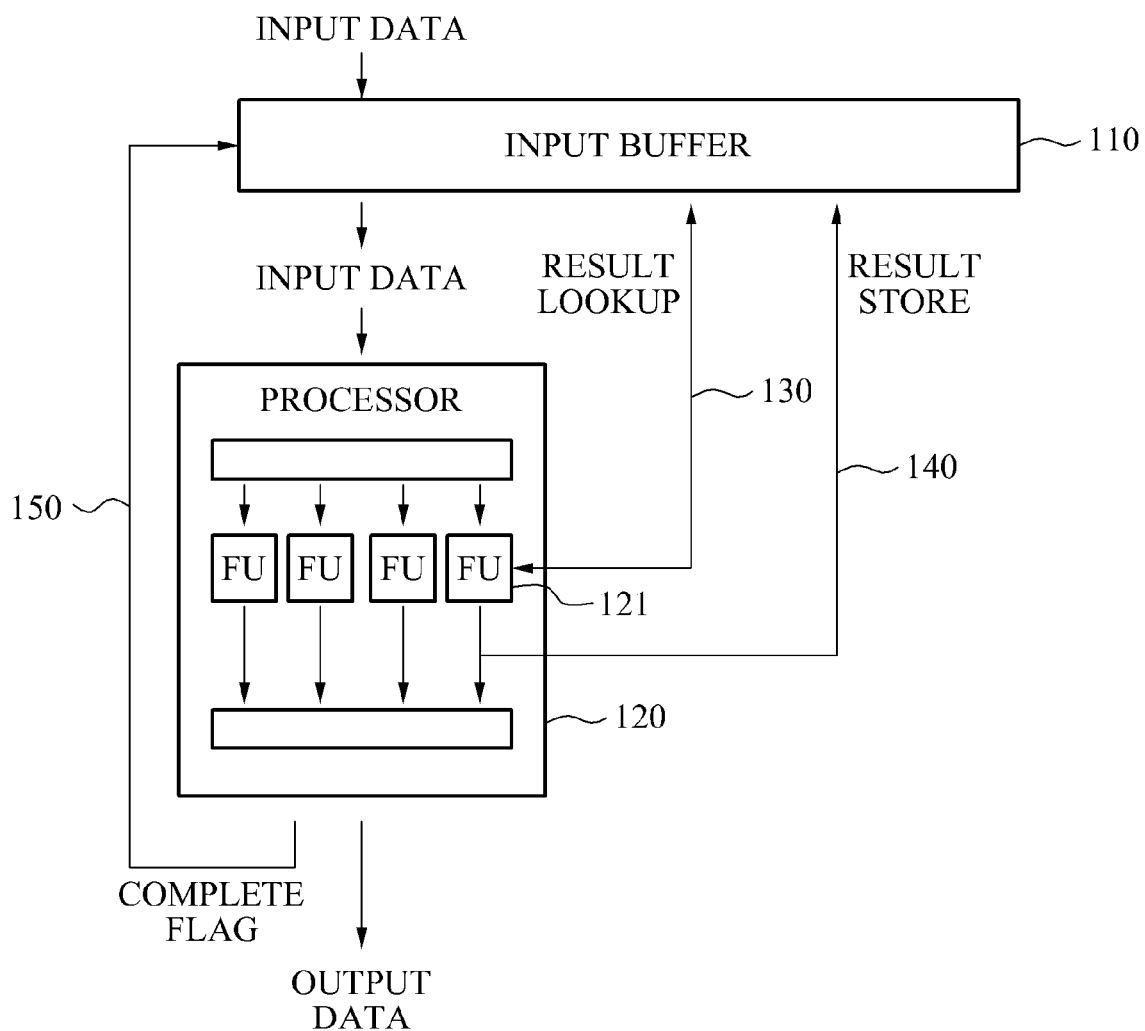
FIG. 1 illustrates an apparatus for non-blocking execution of a static scheduled processor according to example embodiments.

Reference will now be made in detail to embodiments, examples of which are illustrated in the accompanying drawings, wherein like reference numerals refer to like elements throughout. Embodiments are described below to explain the present disclosure by referring to the figures.

When it is determined that a detailed description is related to a related known function or configuration which may make the purpose of the present disclosure unnecessarily ambiguous in the description, such a detailed description will be omitted. Also, terminologies used herein are defined to appropriately describe the exemplary embodiments and thus may be changed depending on a user, the intent of an operator, or a custom. Accordingly, the terminologies must be defined based on the following overall description of this specification.

FIG. 1 illustrates an apparatus 100 for non-blocking execution of a static scheduled processor according to example embodiments.

Referring to FIG. 1, the apparatus 100 may include an input buffer 110, and a processor 120.

Hereinafter, the processor may include a static schedule based processor.

The processor 120 may process at least one operation using transferred input data.

The input buffer 110 may be used to transfer the input data to the processor 120, and store a result of processing the at least one operation.

The processor 120 may include at least one functional unit (FU) 121 configured to execute at least one operation, respectively.

The at least one FU 121 may process the transferred input data using at least one of a regular latency operation and an irregular latency operation.

The at least one FU 121 may identify input data, and determine whether the input data is to be processed using the regular latency operation or the irregular latency operation, based on a result of the identifying.

The at least one FU 121 may process the input data using the regular latency operation when a latency of an operation is regular such that accurate timing computation and optimal schedule generation are possible when compiling.

Conversely, in case a latency of an operation with respect to input data is irregular, the at least one FU 121 may generate a schedule by assuming a single latency value when compiling. Accordingly, the at least one FU 121 may maintain an operation ability without switching to a stall state for a long cycle, although a latency differing from the assumed latency occurs during a runtime.

In particular, the apparatus 100 may maintain a non-blocking characteristic while performing an operation of the static schedule based processor.

The at least one FU 121 may record a final value resulting from the operation in the input buffer 110 after the execution of the operation for which an extra latency occurs is terminated.

The processor 120 may determine an order in which and an FU by which an operation to be applied with respect to input data is to be executed, when compiling.

The processor 120 may be based on a static schedule and thus, may have smaller and simpler hardware, when compared to a dynamic schedule based processor. In addition, the processor 120 may not stall an operation of the processor 120 for a time period corresponding to an extra latency occurring. Accordingly, it is possible to resolve an issue of a typical static scheduled processor incapable of handling a latency occurring at a runtime.

Among operations executed by the processor 120, operations executable without being affected by an external factor may continuously generate regular latencies. For example, in a case of a cache hit while an operation is being processed by referring to a cache memory, and the like, an extra latency other than a predetermined latency may not occur. The processor 120 may process such operations using the regular latency operation.

With respect to operations including an operation affected by an external factor, such as an access to an external memory, for example, or operations for performing a selective operation depending on a condition, the typical processor may generate a different latency each time such operations are executed. The processor 120 may process such operations using the irregular latency operation.

For example, when the typical processor performs an operation of accessing an external memory through a data cache, the operation may be changed based on whether a cache hit or a cache miss occurs, and a latency required for the performance may be changed. In addition, although an identical cache miss occurs, an amount of time expended for accessing the external memory may differ each time and thus, the latency required for the performance may be changed.

Conversely, the processor 120 may designate a determined value as a latency for each operation to be executed. The designated value may be the same value for all operations, or may not be the same value for all operations to be executed. Accordingly, the processor 120 may generate a schedule to produce an optimal execution performance based on the designated latency, and operate according to the determined schedule at a runtime.

When a greater amount of time is necessary for executing a predetermined operation at a runtime, the processor 120 may not maintain a stall state based on an extra latency for system efficiency, and may not stand by until processing of the predetermined operation is completed. In addition, the processor 120 may ignore the predetermined operation for which an extra latency occurs, and may not output incorrect data.

In particular, when an extra latency other than the designated latency occurs, the processor 120 may be incapable of executing a subsequent operation using a result of the operation at a point in time determined by a schedule. More particularly, when the latency is greater than a pre-designated value, the subsequent operation using the result of the operation may not be executed at the point in time determined by the schedule.

In a case of such a situation, in general, a processor may be stalled for a time period corresponding to an extra latency occurring, and execution of an operation according to the original schedule may be resumed when a predetermined operation is completed.

When an extra latency other than the designated latency occurs, the processor 120 may output a dummy value corresponding to a meaningless value, through an FU 121 processing the predetermined operation. In addition, a state bit corresponding to the output dummy value may be stored as a resulting value in the input buffer 110, through a result store signal 140.

The input buffer 110 may store a value resulting from a plurality of irregular latency operations with respect to the input data.

The processor 120 may store a value resulting from an irregular latency operation for each entry, and look up a previously stored resulting value through a result lookup signal 130, before the predetermined operation is processed.

In particular, before processing the predetermined operation, the processor 120 may verify whether re-execution is to be performed by the FU 121 since a state bit corresponding to a dummy value is stored in a previous resulting value of input data being input. For example, in a case of an irregular latency operation, the processor 120 may first look up the previous resulting value to verify whether a value resulting from an operation with respect to corresponding data is stored in the input buffer 110, at a point in time at which the operation is initiated.

When the corresponding resulting value is present, the processor 120 may output the found resulting value after expiration of an expected latency defined by a schedule, in lieu of re-executing the operation. When a state bit corresponding to the dummy value is input, or the resulting value is absent in the input buffer 110, the processor 120 may re-execute the corresponding operation in a valid operation.

When the operation is completed within the expected latency as a result of executing by the FU 121, the processor 120 may output a value resulting from a valid operation.

When the operation is not completed within the expected latency as a result of executing by the FU 121, the processor 120 may output a dummy value. When the processor 120 executes an operation in reality, a corresponding resulting value may be stored in the input buffer 110, irrespective of a latency.

The processor 120 may output the dummy value in order to avoid stalling the operation of the processor 120 for a time period corresponding to an occurrence of an extra latency, and may not output an incorrect resulting value caused by the dummy value.

The processor 120 may verify whether a dummy value is previously output for all intermediate operations for outputting a final result of execution with respect to input data.

In particular, the processor 120 may terminate an operation within a designated latency to output a normal output value, and store the output value in the input buffer 110. In this instance, the processor 120 may transmit a complete flag to the input buffer 110 through a complete flag signal 150. In so doing, the input buffer 110 may be used to identify the complete flag corresponding to the stored output value, and indicate that the operation with respect to the input data is terminated normally.

The normally terminated input data may be output externally as output data, and used for subsequent processing. A normally output entry may be deleted from the input buffer 110.

When a complete flag is not identified, corresponding input data may be determined to be a result including a dummy value, and retransmitted from the input buffer 110 to the processor 120 at a proper point in time, whereby a process of an operation may be resumed.

In particular, the processor 120 may sense a result of an irregular latency operation greater than an expected latency, among operations with respect to input data, and enable the operation with respect to the corresponding data to be executed again. In this instance, a resulting value of previous processing may be stored at a location corresponding to the input data in the input buffer 110.

In so doing, a predetermined schedule may be maintained with respect to an exceptional latency and simultaneously, identical operation results may be achieved. In addition, because the entire processor may not be stalled for a time period corresponding to an extra latency, a processing performance of the processor may be increased.

According to example embodiments, when the apparatus 100 is used, deterioration in an operation ability caused by a stall state of the entire processor for a long cycle may be prevented although a latency greater than an expected latency occurs during an operation with respect to input data.

According to example embodiments, when the apparatus 100 is used, although a latency greater than an expected latency occurs, a processor may process a corresponding operation value as a dummy value without stalling the operation, thereby continuously executing an operation normally with respect to subsequent data. Later, when the original execution of the operation and pending extra latency operations, such as external memory access, for example, are complete, the processor may re-execute the operation with respect to the data processed as the dummy value. In particular, a stall cycle corresponding to an extra latency may be reduced, whereas a processing performance corresponding to reoperation with respect to the corresponding data may be increased.

In general, a processor expends about 10 to 50 cycles for an operation with respect to a single item of input data. In contrast, about 100 to 300 cycles may be expended for an extra latency of a cache memory access operation.

Accordingly, when the apparatus 100 is used, a waste of cycle resulting from 100 to 300 stall cycles expended each time an extra latency occurs may be prevented, and performance may be increased with only 10 to 50 cycles required for re-execution of an operation.

Figure 2:
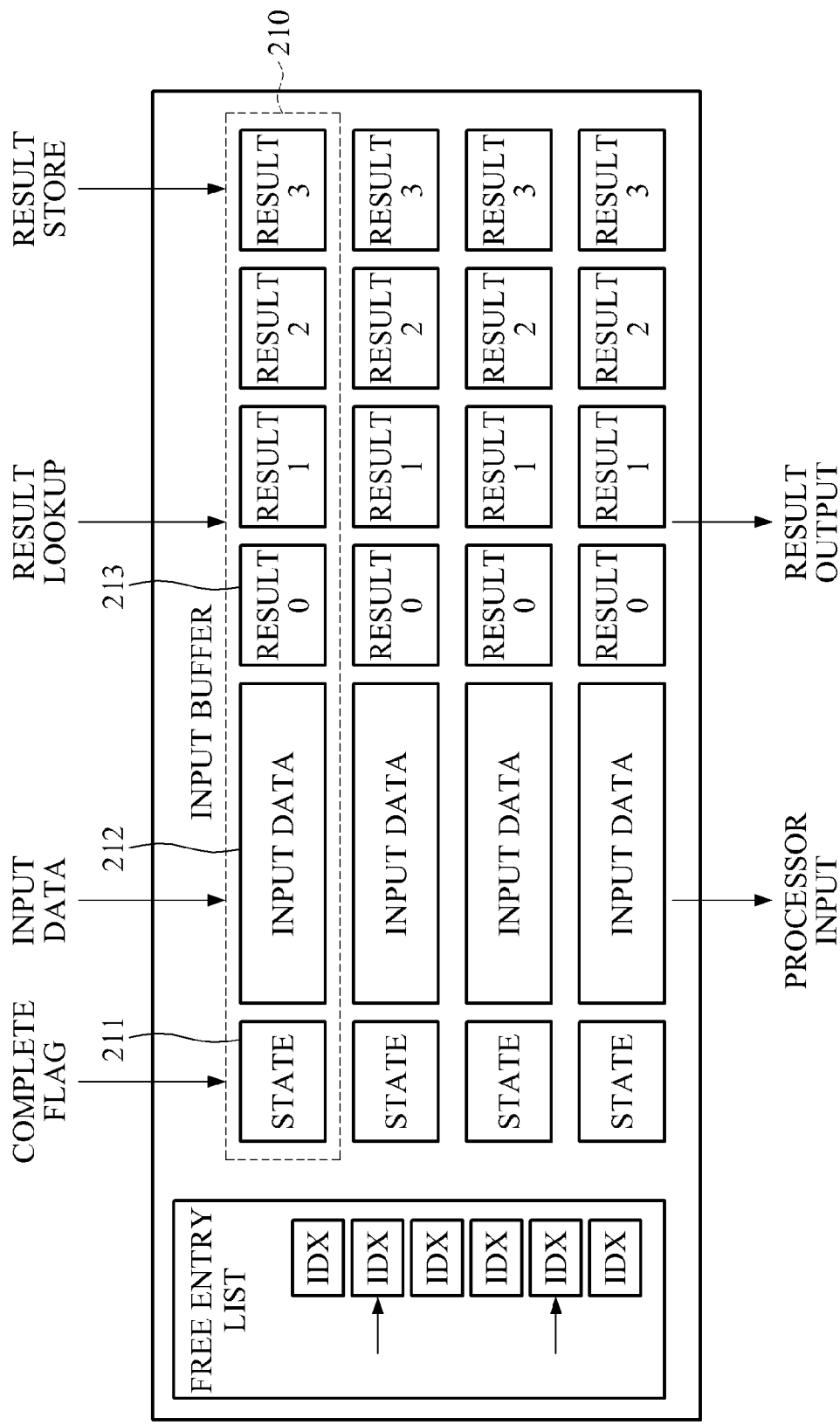
FIG. 2 illustrates an input buffer of an apparatus for non-blocking execution according to example embodiments.

FIG. 2 illustrates an input buffer 200 of an apparatus for non-blocking execution according to example embodiments.

Referring to FIG. 2, the input buffer 200 may store at least one piece of input data to be classified for each entry based on an order the at least one piece of input data is input.

When input data is supplied from an external environment to a processor, the input data may be stored in the input buffer 200.

The input buffer 200 may be used to select a single entry 210 from among stored entries, and transfer the selected entry 210 as an actual input of the processor.

The entry 210 may include a state bit 211, input data 212, and a result buffer 213.

Contents to be stored with respect to the entry 210 in the input buffer 200 may include the input data 212, state information of the entry 210, and a value resulting from a plurality of irregular latency operations. The processor may store a value resulting from an irregular latency operation with respect to the entry 210, and also retrieve the stored resulting value.

In particular, the processor may store a complete flag in the state bit 211, based on a result of processing the input data 212 by an FU. The processor may verify the state bit 211 of the input buffer 200 to determine whether the corresponding input data 212 is to be re-executed.

The input data 212 may refer to a unit to be processed by an FU, and may be accumulated in the input buffer 200 in an order in which the input data 212 is stored.

The result buffer 213 may store a resulting value obtained by processing the input data 212 by an FU. When an extra latency occurs in the FU, a state bit corresponding to a dummy value may be recorded in the result buffer 213. In addition, when the state bit corresponding to the dummy value is recorded in the result buffer 213, a complete flag may not be recorded in the state bit 211.

The entry 210 transferred as the input of the processor may remain in the input buffer 200, rather than being deleted. The entry 210 may be deleted at a point in time at which output data is generated as all processes are completed.

Figure 3:
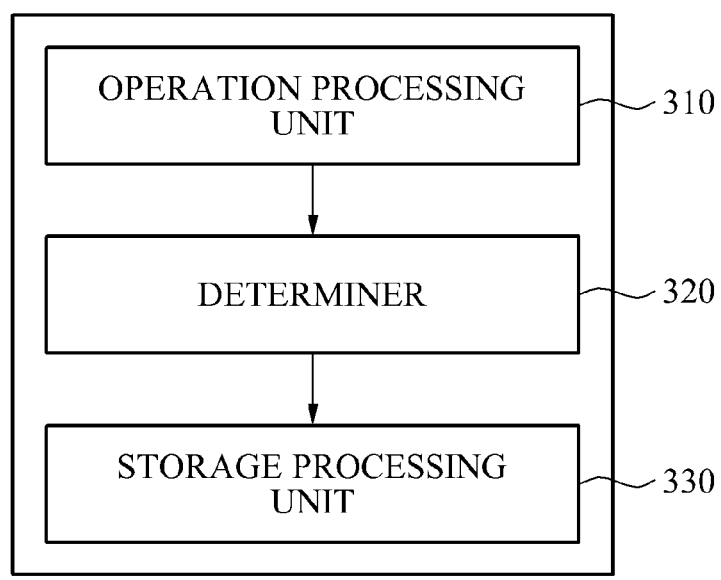
FIG. 3 illustrates a static scheduled processor according to example embodiments.

FIG. 3 illustrates a static scheduled processor 300 according to example embodiments.

Referring to FIG. 3, the static scheduled processor 300 may include an operation processing unit 310, a determiner 320, and a storage processing unit 330.

When reference is to be made to an external memory, an amount of time to be expended for accessing the external memory may be changed each time and thus, a latency for execution may be changed although an identical cache miss occurs.

The static scheduled processor 300 may designate a determined value as a latency for all operations to be executed. Accordingly, the static scheduled processor 300 may generate a schedule to produce an optimal execution performance based on the designated latency, and operate according to the determined schedule at a runtime.

The operation processing unit 310 may receive input data from an input buffer, and execute an operation using a plurality of FUs.

The determiner 320 may determine whether an extra latency occurs in at least one of the plurality of FUs during execution of the operation with respect to the input data.

The storage processing unit 330 may output a dummy value, and store the dummy value in the input buffer when an extra latency occurs.

In this instance, the static scheduled processor 300 may proceed with a subsequent operation, without stalling the operation with respect to the input data.

The static scheduled processor 300 may process the operation with respect to the input data, based on a predetermined latency. When the operation processing unit 310 performs an operation of accessing the external memory through a data cache, the operation may be changed based on whether a cache hit or a cache miss occurs, and an extra latency required for the performance may be generated.

For example, when a greater amount of time is expended for executing a predetermined operation at a runtime, the static scheduled processor 300 may not maintain a stall state based on the extra latency for system efficiency, and may not stand by until the processing of the predetermined operation is completed. In addition, the static scheduled processor 300 may ignore the predetermined operation for which an extra latency occurs and thus, avoid outputting incorrect data.

In particular, when an extra latency other than a designated latency occurs, the static scheduled processor 300 may be incapable of executing a subsequent operation using a result of the operation at a point in time determined by a schedule. More particularly, when the latency is greater than a pre-designated value, the subsequent operation using the result of the operation may not be executed at the point in time determined by the schedule.

In such a situation, the storage processing unit 330 may output a dummy value and store the dummy value in the input buffer, when an extra latency occurs.

The operation processing unit 310 may verify whether a value resulting from a previous operation with respect to the input data transferred from the input buffer is stored. When the value resulting from the previous operation is stored, the operation processing unit 310 may output the value resulting from the previous operation after an expected latency defined by the schedule expires.

When the value resulting from the previous operation is absent in the input buffer, the operation processing unit 310 may re-execute the operation with respect to the input data.

According to example embodiments, when the static scheduled processor 300 is used, deterioration in an operational ability caused by a stall state of the entire processor for a long cycle may be prevented although a latency greater than an expected latency occurs during an operation with respect to input data.

According to example embodiments, when the static scheduled processor 300 is used, although a latency greater than an expected latency occurs, the static scheduled processor 300 may process a corresponding operation value as a dummy value without stalling the operation, thereby continuously executing an operation normally with respect to subsequent data. In the future, the static scheduled processor 300 may re-execute the operation with respect to the data processed as the dummy value. In particular, a stall cycle corresponding to an extra latency may be reduced, whereas a processing performance corresponding to reoperation with respect to the corresponding data may be increased.

In general, a processor expends about 10 to 50 cycles for an operation with respect to a single item of input data. In contrast, about 100 to 300 cycles may be expended for an extra latency of a cache memory access operation.

Accordingly, when the static scheduled processor 300 is used, a waste of cycle resulting from 100 to 300 stall cycles expended each time an extra latency occurs may be prevented, and performance may be increased with only 10 to 50 cycles required for re-execution of an operation.

Figure 4:
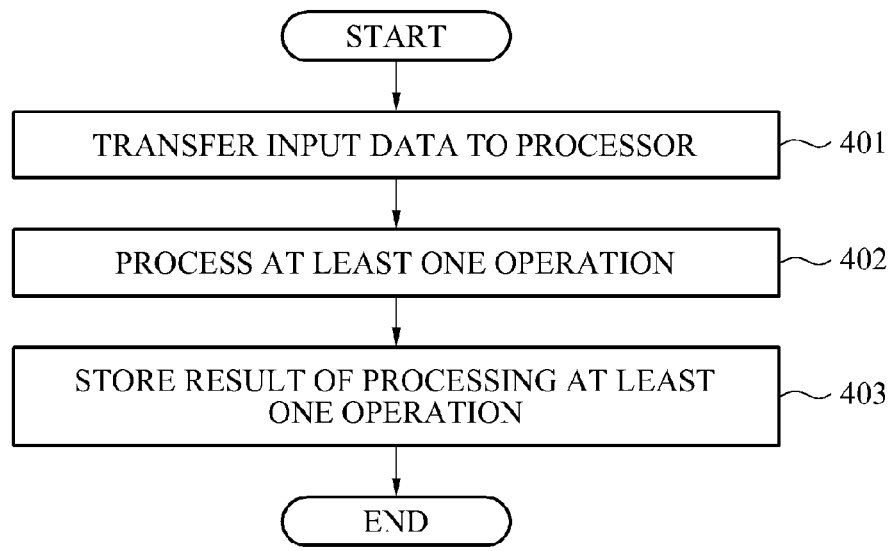
FIG. 4 illustrates a method for non-blocking execution of a static scheduled processor according to example embodiments.

FIG. 4 illustrates a method for non-blocking execution of a static scheduled processor according to example embodiments.

Referring to FIG. 4, in operation 401, an input buffer may be used to transfer input data to a processor.

In operation 402, the processor may process at least one operation using the transferred input data.

In operation 403, the input buffer may be used to transfer the input data to the processor, and store a result of processing the at least one operation.

In order to process the at least one operation, the transferred input data may be processed using at least one of a regular latency operation and an irregular latency operation.

An operation with respect to the input data may be processed based on a predetermined latency. In this instance, the operation with respect to the input data may be executed by applying the regular latency operation.

When an operation of accessing an external memory through a data cache is performed, the operation may be changed based on whether a cache hit or a cache miss occurs, and an extra latency for the performance may be generated. In this instance, the operation with respect to the input data may be executed by applying the irregular latency operation.

In order to process the at least one operation, whether the input data is to be processed using the regular latency operation or the irregular latency operation may be determined.

When it is determined that the input data is to be processed using the irregular latency operation, whether a value resulting from a previous operation with respect to the input data is stored in the input buffer may be verified.

When the value resulting from the previous operation is stored in the input buffer, the value resulting from the previous operation may be output after expiration of an expected latency defined by a schedule.

When the value resulting from the previous operation is absent in the input buffer, the operation may be executed, and whether an extra latency occurs during the execution of the operation may be determined.

When an extra latency occurs during the execution of the operation, due to a cache miss, for example, a dummy value may be output and a state bit corresponding to the output dummy value may be recorded in the input buffer to indicate that a resulting value is incorrect.

When an extra latency does not occur during the execution of the operation, a value resulting from the execution of the operation may be output. In addition, the output resulting value may be recorded in the input buffer.

According to example embodiments, when the method of FIG. 4 is used, deterioration in an operational ability caused by a stall state of the entire processor for a long cycle may be prevented although a latency greater than an expected latency occurs during an operation with respect to input data.

According to example embodiments, when the method of FIG. 4 is used, although a latency greater than an expected latency occurs, a processor may process a corresponding operation value as a dummy value without stalling the operation, thereby continuously executing an operation normally with respect to subsequent data. Later, the processor may re-execute the operation with respect to the data processed as the dummy value. In particular, a stall cycle corresponding to an extra latency may be reduced, whereas a processing performance corresponding to reoperation with respect to the corresponding data may be increased.

Figure 5:
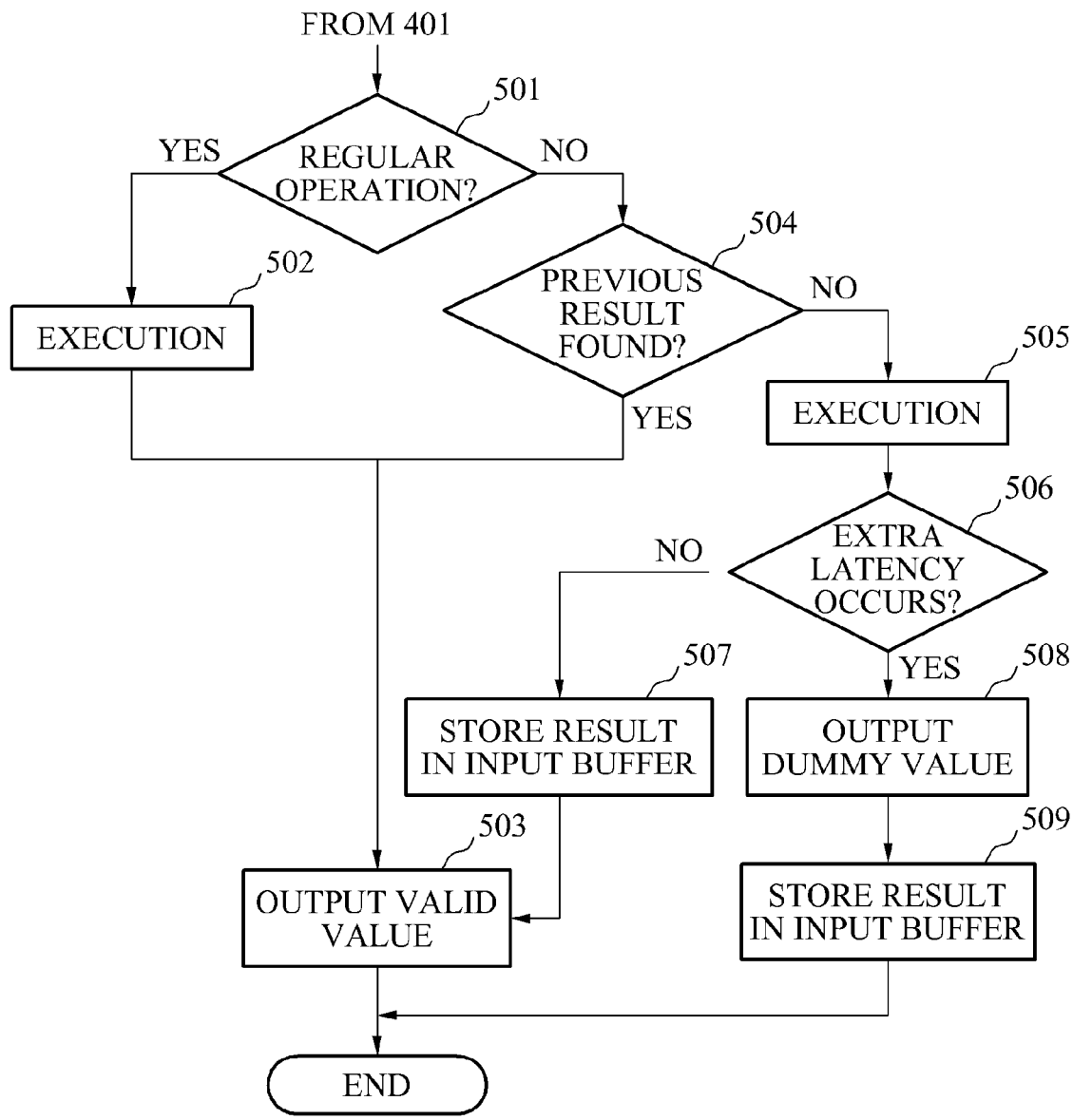
FIG. 5 illustrates an operating method of a processor according to example embodiments.

FIG. 5 illustrates an operating method of a processor according to example embodiments.

According to the present embodiments, input data transferred from an input buffer may be received, and an operation with respect to the input data may be executed. Whether an extra latency occurs in at least one of a plurality of FUs during the operation with respect to the input data may be determined. When an extra latency occurs, a dummy value may be output and stored in the input buffer.

In particular, in operation 501, whether the transferred input data is to be processed using a regular operation or an irregular operation may be determined before the operation with respect to the input data from the input buffer is executed. For example, when a complete flag with respect to corresponding input data is set in a state bit of the input buffer, the input data may be processed using the regular operation.

When the input data is determined to be processed using the regular operation, a predetermined operation with respect to the input data may be executed in operation 502, and a valid value resulting from the execution may be output in operation 503.

When the input data is determined to be processed using the irregular operation, whether a value resulting from a previous operation with respect to the input data transferred from the input buffer is stored may be verified in order to execute the operation, in operation 504.

When the value resulting from the previous operation is stored, the value resulting from the previous operation may be output as a valid value, in operation 503. In particular, the value resulting from the previous operation may be output after expiration of an expected latency defined by a schedule.

When the value resulting from the previous operation is absent, the operation with respect to the input data may be executed in operation 505.

In operation 506, whether an extra latency occurs during execution of the operation with respect to the input data may be determined. For example, if an operation does not finish after a designated latency of 4 cycles of execution, extra latency for the operation may be determined to have occurred. However, the disclosure is not limited to the above-described determination, and other methods of determining whether an extra latency occurs may be used.

When an extra latency does not occur, a value resulting from the execution may be recorded in the input buffer, in operation 507. When an extra latency occurs, a dummy value may be output in order to prevent stalling of the processor, in operation 508.

In operation 509, the output dummy value may be stored in the input buffer.

According to example embodiments, when the method of FIG. 5 is used, deterioration in an operational ability caused by a stall state of the entire processor for a long cycle may be prevented although a latency greater than an expected latency occurs during an operation with respect to input data.

According to example embodiments, when the method of FIG. 5 is used, although a latency greater than an expected latency occurs, a processor may process a corresponding operation value as a dummy value without stalling the operation, thereby continuously executing an operation normally with respect to subsequent data. In the future, the processor may re-execute the operation with respect to the data processed as the dummy value.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for non-blocking execution of a static scheduled processor, the apparatus comprising:

a processor to process at least one operation using transferred input data, the processor comprising at least one functional unit (FU) to execute the at least one operation; and an input buffer used to transfer the input data to the processor, and store a result of processing the at least one operation, wherein the at least one FU selectively processes the transferred input data using at least one of a regular latency operation and an irregular latency operation, wherein, when an irregular operation is used to process the transferred input data and when a value resulting from a previous operation is absent in the input buffer, the at least one FU executes an operation and determines whether an extra latency occurs during execution of the operation, wherein, when an extra latency occurs during execution of the operation, the at least one FU outputs a dummy value and records a state bit corresponding to the output dummy value in the input buffer, and when the extra latency did not occur during execution of the operation, the at least one FU outputs a value resulting from the execution of the operation and records the output resulting value in the input buffer.

2. The apparatus of claim 1, wherein the at least one FU records a final value resulting from the operation in the input buffer after the execution of the operation for which the extra latency occurs is terminated.

3. The apparatus of claim 1, wherein:
the input buffer comprises a state register, and a result buffer,
the state register stores a state with respect to the input data, and
the result buffer stores a value resulting from a previous operation.

4. The apparatus of claim 3, wherein the state register stores a state associated with whether the operation with respect to the input data is to be re-executed.

5. The apparatus of claim 1, wherein the at least one FU determines whether the input data is to be processed using the regular latency operation or the irregular latency operation.

6. The apparatus of claim 5, wherein, when the input data is determined to be processed using the irregular latency operation, the at least one FU verifies whether a value resulting from a previous operation with respect to the input data is stored in the input buffer.

7. The apparatus of claim 6, wherein, when the value resulting from the previous operation is stored in the input buffer, the at least one FU outputs the value resulting from the previous operation after expiration of an expected latency defined by a schedule.

8. A static scheduled processor, comprising:
an operation processing unit to receive input data transferred from an input buffer, and execute an operation using a plurality of functional units (FUs);
a determiner to determine whether an extra latency occurs in at least one of the plurality of FUs during execution of the operation with respect to the input data; and
a storage processing unit to selectively output a dummy value and selectively store the dummy value in the input buffer when an extra latency occurs, and when the extra latency did not occur, a value resulting from the execution of the operation is stored in the input buffer,
wherein, when an irregular operation is used to process the transferred input data and when a value resulting from a previous operation is absent in the input buffer, the at least one FU executes the operation and determines whether an extra latency occurs during the execution of the operation, wherein, when an extra latency occurs during execution of the operation, the at least one FU outputs a dummy value and records a state bit corresponding to the output dummy value in the input buffer, and when the extra latency did not occur during the execution of the operation, the at least one FU outputs a value resulting from the execution of the operation and records the output resulting value in the input buffer.

9. The processor of claim 8, wherein the operation processing unit verifies whether a value resulting from a previous operation with respect to the transferred input data is stored in the input buffer, and executes an operation of the input data, when the value resulting from the previous operation is absent in the input buffer.

10. The processor of claim 8, wherein the operation processing unit verifies whether a value resulting from a previous operation with respect to the transferred input data is stored in the input buffer, and outputs the value resulting from the previous operation after expiration of an expected latency defined by a schedule, when the value resulting from the previous operation is stored in the input buffer.

11. A method for non-blocking execution of a static scheduled processor, the method comprising:

transferring input data to the processor, processing, by the processor, at least one operation using the transferred input data; and storing a result of processing the at least one operation, wherein the processing comprises selectively processing the transferred input data using at least one of a regular latency operation and an irregular latency operation, wherein the processing comprises determining whether the input data is to be processed using the regular latency operation or the irregular latency operation, wherein the processing comprises executing an operation and determining whether an extra latency occurs during execution of the operation when the value resulting from the previous operation is absent in the input buffer, wherein the processing comprises outputting a dummy value and recording a state bit corresponding to the output dummy value in the input buffer when an extra latency occurs during execution of the operation, and when an extra latency did not occur, outputting a value resulting from the execution of the operation and recording it in the input buffer.

12. The method of claim 11, wherein the processing comprises recording a final value resulting from the operation in the input buffer after the execution of the operation for which the extra latency occurs is terminated.

13. The method of claim 11, wherein the processing comprises verifying whether a value resulting from a previous operation with respect to the input data is stored in an input buffer, when the input data is determined to be processed using the irregular latency operation.

14. The method of claim 13, wherein the processing comprises outputting the value resulting from the previous operation after expiration of an expected latency defined by a schedule, when the value resulting from the previous operation is stored in the input buffer.

15. A method for execution of a plurality of operations in a static scheduled processor, the method comprising:

selectively outputting a dummy value during an execution of a first operation of the plurality of operations based on an execution time of the first operation;

executing a second operation of the plurality of operations; and obtaining a result based on a normal completion of the first operation by re-executing the first operation, wherein the dummy value is outputted when the execution time of the first operation exceeds a predetermined value, and a value resulting from the execution of the operation is outputted when the execution time of the first operation is less than the predetermined value, wherein, when an irregular operation is used to process the transferred input data and when a value resulting from a previous operation is absent in the input buffer, the at least one FU executes the operation and determines whether an extra latency occurs during the execution of the operation, wherein, when an extra latency occurs during execution of the operation, the at least one FU outputs a dummy value and records a state bit corresponding to the output dummy value in the input buffer, and when the extra latency did not occur during the execution of the operation, the at least one FU outputs a value resulting from the execution of the operation and records the output resulting value in the input buffer.

16. The method of claim 15, wherein the predetermined value comprises a processor execution cycle count for the first operation.

* * * * *